United States Patent [19]

Brower

[11] 4,182,947
[45] * Jan. 8, 1980

[54] UNDERWATER CUTTING ROD

[76] Inventor: Jerome S. Brower, 2040 N. Towne Ave., Pomona, Calif. 91767

[*] Notice: The portion of the term of this patent subsequent to Jan. 17, 1995, has been disclaimed.

[21] Appl. No.: 765,695

[22] Filed: Feb. 4, 1977

Related U.S. Application Data

[63] Continuation-in-part of Ser. No. 639,289, Dec. 10, 1975, Pat. No. 4,069,407.

[51] Int. Cl.² .............................................. B23K 9/00
[52] U.S. Cl. ...................................... 219/70; 219/72; 219/130.4; 219/257
[58] Field of Search ............... 110/1 R; 219/68, 69 R, 219/69 C, 69 W, 69 E, 70, 72, 145, 130.4; 361/253, 256, 257

[56] References Cited

U.S. PATENT DOCUMENTS

| | | | |
|---|---|---|---|
| 3,260,076 | 7/1966 | Humberg | 266/48 X |
| 3,507,230 | 4/1970 | Seib | 431/99 X |
| 3,591,758 | 7/1971 | Clucas | 219/70 |
| 3,751,625 | 8/1973 | Hummel et al. | 219/70 |
| 4,012,621 | 3/1977 | Vchida et al. | 219/69 E |
| 4,069,907 | 1/1978 | Brower | 219/72 |

FOREIGN PATENT DOCUMENTS 2362657  7/1974  Fed. Rep. of Germany ............. 219/70

OTHER PUBLICATIONS

Welding Handbook, AWS. New York, N.Y., Section two, 1969, pp. 30,31.
Roway "U.S. Developments in Underwater Cutting" 1945, pp. 474–476 & 479.
No Name– Ad Brochure Identified as Cabinet, 11/44.

Primary Examiner—E. A. Goldberg
Attorney, Agent, or Firm—Roylance, Abrams, Berdo & Farley

[57] ABSTRACT

A torch for cutting metals and nonmetals underwater includes an electrode having a tube and a plurality of rods within the tube. Some of the rods are ferrous metal and a smaller number of them are a nonferrous metal selected from the group consisting of Al, Mg, Ti, or alloys thereof. Oxygen and electrical power are supplied through the electrode at least to start the cutting with an ionized gaseous cone. The cone persists when power is removed and is terminated by stopping oxygen flow. An independently portable apparatus using the torch is disclosed.

8 Claims, 7 Drawing Figures

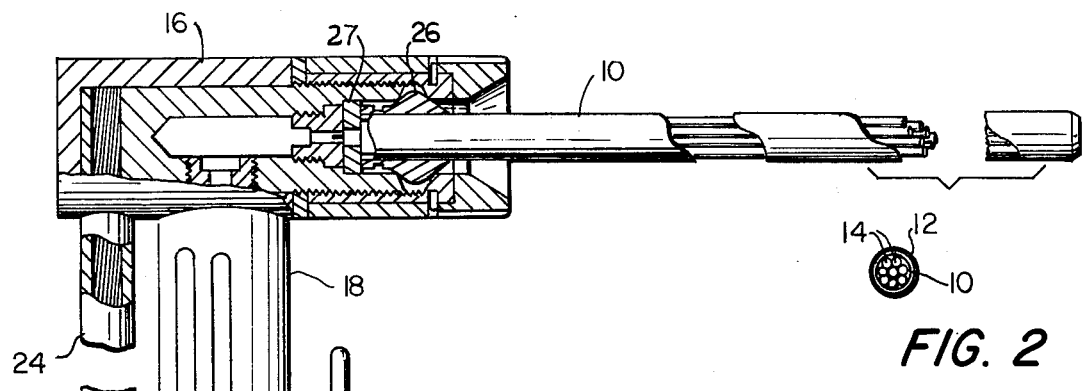
FIG. 1
FIG. 2
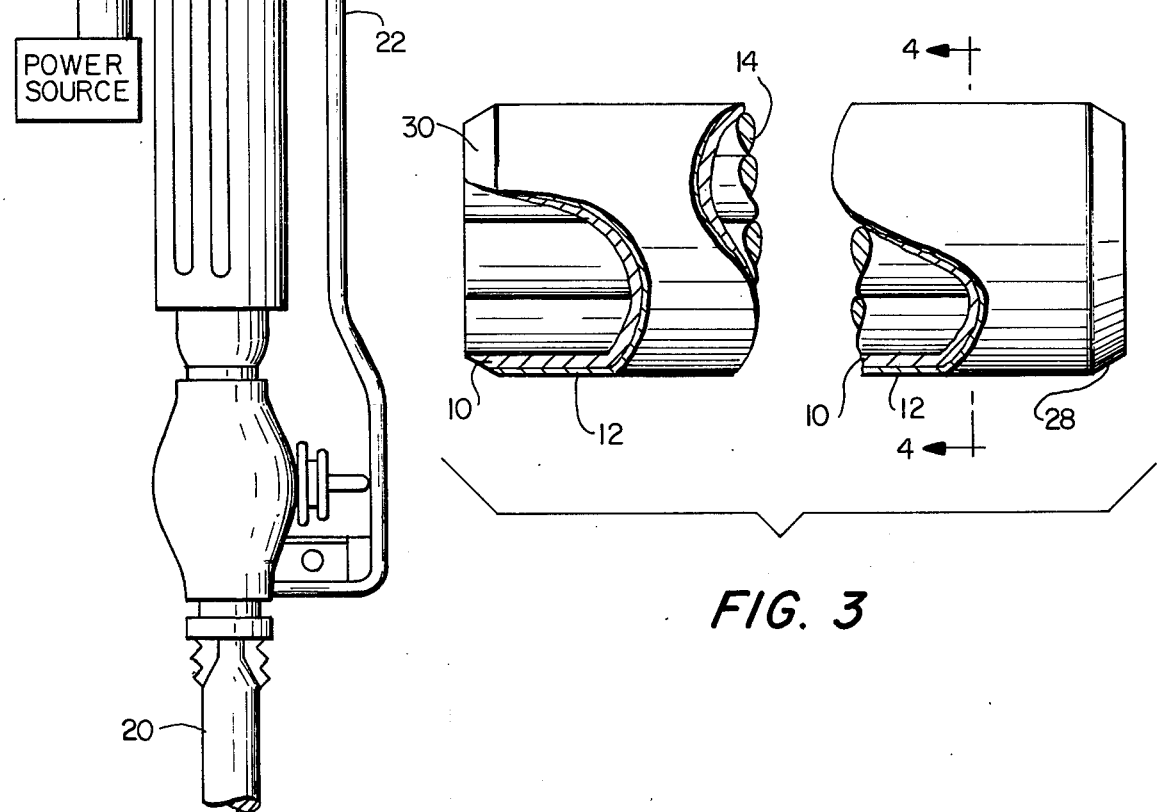
FIG. 3

UNDERWATER CUTTING ROD

This is a continuation-in-part of U.S. patent application Ser. No. 639,289, filed Dec. 10, 1975, now U.S. Pat. No. 4,069,407.

This invention relates to a torch for cutting underwater.

BACKGROUND OF THE INVENTION

Electric arc cutting and welding torches are well known in the art. Such devices as commonly used on the surface are adapted for underwater use in the salvaging of sunken vessels and drill platforms, repairing ships and in the construction and maintenance of subsea structures.

Cutting torches as presently used underwater have particularly severe problems in cutting nonferrous metals, stainless steels and nonconductive substances such as cement, concrete, bitumens, barnacles and other marine growth. Maintaining an arc underwater, at any depth, is impossible when the material to be cut is nonconductive. The present generation of arc cutting rods will not penetrate or cut through nonconductive materials. Present arc-oxygen systems cannot function without a power source. Where the power is removed, the arc extinguishes itself, and the rod will not sustain itself in burning. Available arc-oxygen units cannot cut through nonconductive materials.

The arc-oxygen method of cutting metals is based on the same principle as that employed in oxyacetylene cutting. In the latter, the metal is first locally preheated to incandescence by means of the oxyacetylene flame. When incandescence is reached, a high velocity of oxygen is impinged upon the preheated spot. The oxygen jet performs the double duty of oxidizing or burning the core of the preheated portion and removing the products of combustion. The oxyacetylene flame continuously advances the incandescent spot in preparation for the action of the oxygen stream. In arc-oxygen cutting, preheating is performed by the electric arc maintained between the material being cut and the electrode. Since the heat energy available in an arc is much greater than that of an oxyacetylene flame, preheating with the arc-oxygen method is practically instantaneous. Therefore, the instant the arc is struck, the high velocity oxygen stream is admitted to impinge upon the preheated spot where the same phenomena occur as given for the oxyacetylene cutting. Advancing the electrode along the intended line of cut while the electric arc is continuously maintained results in the uninterrupted succession of preheat, oxidation and removal of the burned metal.

SUMMARY OF THE INVENTION

An object of this invention is to effectively provide an underwater cutting rod which will solve the problems described above.

A further object of this invention is to provide a cutting electrode and system which is far superior to any previously used in the art. In addition, it is an object to provide an electrode which is lightweight, readily adaptable to most standard rod holders, easy to handle and use, which develops an arc under any nonexplosive atmosphere, including water, which ignites the tip of the rod to produce progressive burning, and develops temperatures high enough to melt any known metal, mineral or combination of metals and minerals.

It is a further object of this invention to provide an underwater cutting electrode which will maintain ultrahigh temperatures and continue to burn underwater without the continuous presence of an electrical current.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification and wherein:

FIG. 1 is a partial side elevation, in partial section, of a torch handle and electrode rod in accordance with the invention;

FIG. 2 is an end elevation of the rod of FIG. 1;

FIG. 3 is an enlarged foreshortened side elevation of the rod of FIGS. 1 and 2, in partial section;

DETAILED DESCRIPTION

Figure 4:
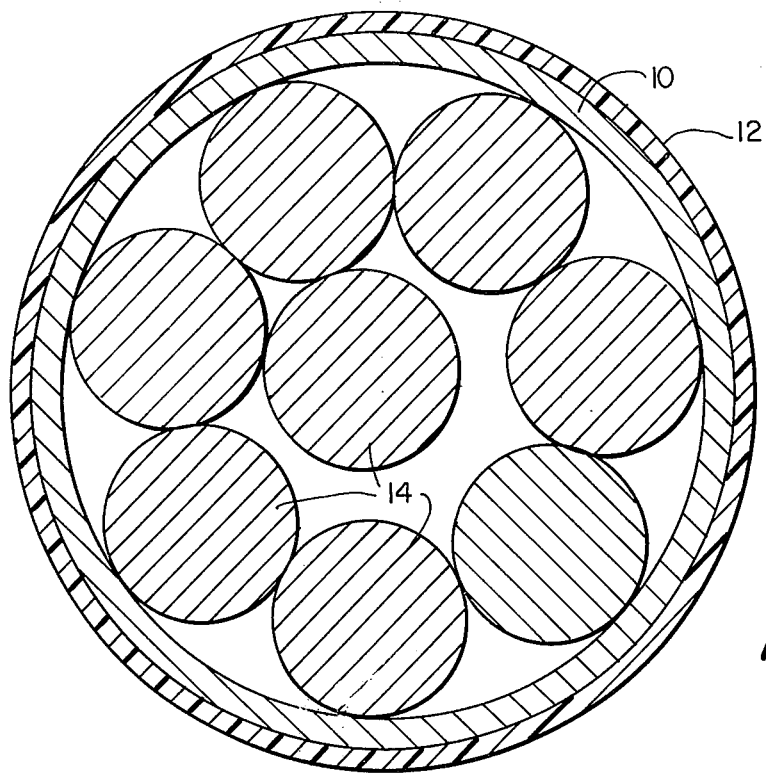
FIG. 4 is an enlarged sectional end elevation along lines 4—4 of FIG. 3.

Referring first to FIG. 4, the sectional view of that figure shows an outer shell 10 which comprises a relatively thin-walled lightweight steel tube to provide the outer casing of the cutting rod, this tube acting, in major part, to conduct electrical current through the rod as will be described. Tube 10 is supplied with an exterior coating 12 of an electrically nonconductive material which is preferably a plastic such as epoxy, vinyl, acrylic or urethane which acts as an insulative and protective coating for tube 10. This coating can be provided in a simple manner by simply wrapping the exterior of the tube with an electrically nonconductive tape. The coating, being an insulator, prevents inadvertant ignition at the side of the rod should the rod be touched against an electrically conductive grounded member accidentally. It thus prevents side-rod sticking as well as side-rod arcing and blowout.

Located inside tube 10 is a plurality of rods 14, each of which is metallic. Some of the rods are made of a ferrous metal, such as steel, and some of the rods are made of a nonferrous metal or alloys thereof. A typical combination, which has been found to be particularly satisfactory, is steel rods and aluminum rods, the preferred ratio of steel rods to aluminum rods clustered together within the tube being approximately seven steel to one aluminum. However, the cutting rod electrode will operate satisfactorily with a range of ratios between about 3:1 steel to aluminum and about 10:1 steel to aluminum. It has been found that the highest temperatures and best burning results are obtained with a ratio of 5-7:1, steel to aluminum. It should also be noted that the aluminum can be replaced by a metal selected from the group consisting of magnesium, titanium, or alloys of two or more of the metals from the group magnesium, aluminum and titanium. Aluminum, however, is preferred.

FIG. 1 illustrates a torch handle assembly with which the rod can be used. As shown therein, an electrode rod holder 16 has a central passage which receives rod 10 in a conventional fashion as shown in U.S. Pat. No. 2,417,650, Kandel, the holder being connected to a handle 18. The holder and handle have connected passages through which gas can pass, the gas being delivered into a gas inlet tube 20. The gas is usually oxygen although other gases may be used for certain results. A gas flow control handle 22 regulates the volume of gas passing through the handle and into the electrode tube, the flow of gas being controlled by the person handling the torch. An electrical power input cable 24 is connected to a source of power and provides means for bringing electrical energy to tube 10. The gas passes through the control valve on the handle and flows through a perforated tube and out of the torch which is held in place in the holder 16 by a collet 26 and washer 27, the gas passing under pressure between metal rods 14 which are encased in tube 10, the gas igniting at the outer distal end of tube 10 adjacent the work point. The oxygen is passed through tube 10 longitudinally at pressures varying from 30 psig to 200 psig along the axis of the cluster of rods 14, passing through the spaces therebetween.

The purpose of this gas medium is twofold. One purpose is to provide an oxidizing envelope at the tip of the tube 10 and to aid in the complete combustion at the tip, as well as blowing away the slag. The second purpose is to initiate and maintain a continuous thermitic process at the tip. Provision of the oxygen elevates the temperature at the tip to the white heat range and provides a gaseous cone for the ionized arc to form. Methods for providing the introduction of oxygen to the rods through the tube, using devices such as the handle and holder generally illustrated, are well known in the art.

An electrical current of from 1.5 to 600 amperes, for example, provided by a conventional generator, and passing through the torch head and collet, is introduced to the cutting tube through conductor cable 24. This current is used to strike an arc at the end of the tube 10 by grounding the end of the rod against the work itself, if the work is conductive, or against a grounded conductive plate if the work is nonconductive. The arc, in conjunction with the flow of oxygen, ignites the cutting rod and establishes the gaseous cone simultaneously. The melting of the binary metallic system of rods within tube 10 occurs at the introduction of the arc, whereupon a eutectic is formed. Oxygen passing into the melt causes an exchange and reformation of $Al_2O_3$-$Fe^-$ in the proper ratio. Continuous burning occurs so long as the oxygen is present. At this point, temperatures are developed which are high enough to melt metals, alloys, minerals in their natural state, and concrete. The rod will melt these materials underwater at any working depth and on dry land at all altitudes. The electrical current may be applied to the tube 10 and the individual rods 14 on a continuing basis during operation of the torch, or can be shut off once the tube 10 ignites. The thermitic process with elevated temperatures will sustain burning with or without the current. However, maintaining the supply of current to maintain the arc when cutting conductive materials increases the burning rate by between 15 and 20 percent. The tube 10 in conjunction with the feedthrough oxygen burns at about 5,432° F., as measured using an optical pyrometer. The burning tip is not quenched by the water. The tube 10 as set forth in this invention, will easily cut, burn or melt through concrete, steel, brass or cast iron underwater.

When used to burn through coral, concrete, pipe covering or any marine growth, a conductive starter plate is required. It is a simple grounded contact plate which is placed on, next to, or near the subject target to complete the circuit when power is supplied to the torch head. When the arc is struck, it ignites the tube at the tip and the burning is sustained by the continuous flow of oxygen. The end of the tube is then moved to the target and melting, burning or cutting begins. Removing the rod from the starter plate does not extinguish the flame at the tip of the rod. This unusual characteristic allows for melting and/or cutting through nonconductive substances. This invention provides a continuous process which consumes the rod from and at the point of contact which results in the super-elevated temperature. The transfer of this heat from the tube to the subject results in a lava-like melt and subsequent flow of molten materials away from the point of contact.

Electric arcs, the region where a sharply focused energy beam heats a solid surface, and the impact region on a solid surface of a high-intensity, high-energy particle beam, all have one important feature in common. This is the concentration of energy per particle, in a small region, much higher than the conventional equipartition energy at normally obtainable temperatures. This is achieved by utilizing the method of concentrating energy in the region at a rate far greater than it can be removed by the ordinary processes of heat removal such as conduction, convection or radiation. The result is the creation of a highly excited region which can be viewed in many cases of interest as a dense super-heated plasmic cone.

In addition, this invention provides a continuous thermitic reaction cone at the point of work. As stated, the temperature within the apparent plasmic cone is approximately 5,432° F.

The classic thermite reaction consists of eight moles of aluminum plus three moles of magnetic iron oxide. The reaction to completion produces four moles of aluminum oxide plus nine moles of molten iron as illustrated by the following: $8Al + 3Fe_3O_4 \rightarrow 4Al_2O_3 + 9Fe$. When ignited, this mixture produces an enormous quantity of heat, i.e., 758,000 calories per gram molecular weight. This heat is sufficient to raise the temperature of the region to 5,432° F.

The rod of the present invention is completely consumed during the operation; thus, no waste product is developed which would cause environmental problems in the use of the device.

When a chemical reaction is subjected to an electric current, or conducted within an electric field, different results are observed and can be attained, depending on the nature of the substances, than normally observed. The extent of chemical change is dependent, in each case, upon the amount of current which passes.

It has been noted and recorded that the application of current during the cutting operation increases the efficiency of the system by as much as 20%. When the current is removed, the tube continues to burn underwater with sufficient energy to cut or melt all of the materials stated above. Variations of current from 30 amperes to 600 amperes appear to be the most efficient range of operation depending upon the thickness and thermal conductivity of the target material.

The tube 10 and rods 14 of this invention are completely consumed during its operation. The rods of the present invention 14, contained within the tube 10, are used in a diameter of approximately 0.094 inches, although diameters of 0.031 through 0.25 inches may be utilized. However, diameters of approximately 0.094 inches are considered best. There is no flux contained within the rods or tube of the present invention, and there is no packing between the steel and aluminum rods.

The tube 10 may range from about 0.18 inches in diameter to about 0.75 inches in diameter with a diameter of about 0.375 inches considered best. The thickness of the plastic coating 12 is not critical and thicknesses of about 0.01 to about 0.1 inches is normal, and is enough to limit external side wall conductivity, although thicker coatings can be used.

Referring now to FIG. 2, there is shown an end view of the tube 10 with the rods 14 and the plastic coating 12.

FIG. 3 shows the tube 10 with the rods 14 clustered within. The ends 28 and 30 of rod 10 are crimped to hold the rods in the tube 10.

Various tests were made with rods of the present invention to determine cutting time and performance characteristics. A chart showing the results follows. The tests were done by cutting anchor, chain or steel plate at a 20 to 60 foot depth of water.

the electrode itself. That electrode includes a tube 40 having an insulating coating or covering 41 on the exterior thereof, as with the embodiment of FIG. 4. Within tube 40 is a plurality of metal rods including a number of ferrous rods 42 and a nonferrous rod 43 which can be aluminum or one of the other materials previously mentioned. Again, the ratio of ferrous to nonferrous materials can be in the range of 3:1 to 10:1 with 7:1 being preferred.

Figure 5:
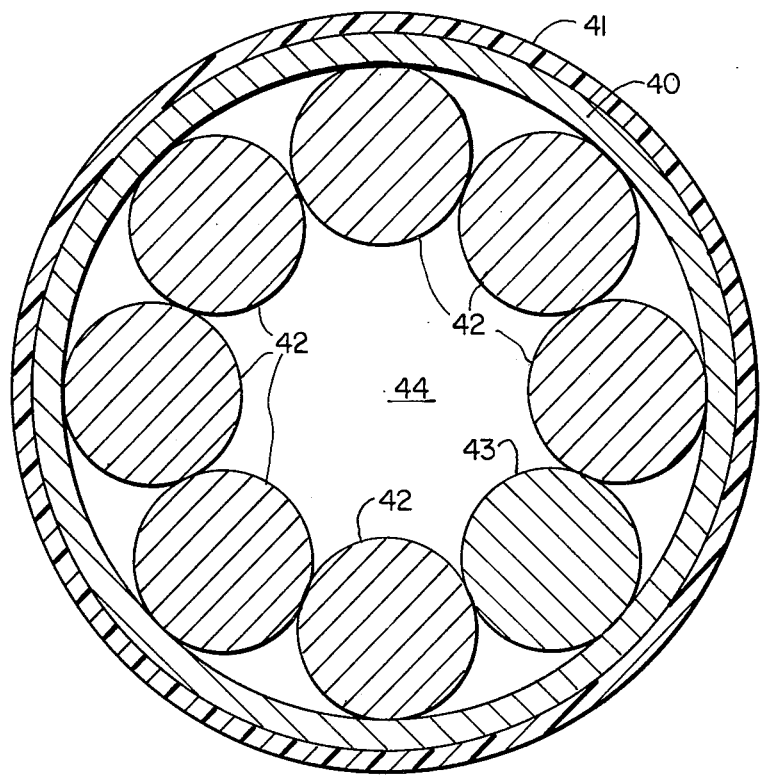
FIG. 5 is an enlarged sectional end elevation similar to FIG. 4 of a second embodiment of a rod in accordance with the invention.

Of particular significance to the embodiment of FIG. 5 is the central opening 44 within the cluster of rods. The opening can be formed by placing a central plug (not shown) having a diameter equal to the inside diameter of tube 40 less twice the diameter of one of rods 42 or 43 (the diameters of which are substantially equal to each other) inside the tube surrounded by the accompanying rods 42 and 43. The plug can be removed during the crimping operation. This suggested assembly technique is only for purposes of illustration and example and forms no specific part of the invention.

With the electrode having the central opening 44, a concentrated beam of oxygen is created without increasing the pressure. This impinging beam or column of gas allows for increased oxidation and effective slag removal and is easily obtained with the structure of

| | | | UNDERWATER CUTTING ROD (Depth of Test: 20 to 60 Feet) | | | |
|---|---|---|---|---|---|---|
| Insulative Coating | Amps | Oxygen Pressure | Metal Size and Type | Coating Adherence | Cutting Ability | Time (Minutes) |
| Extruded vinyl coating or electrical tape .015" | 135 | 80 psi | 1" chain heavy rust | Good | Cut 1" link | |
| | 200 | | " | " | | |
| | 200 | 60 psi | " | " | Cutting ability reduced | 1.05 |
| | 200 amps to start only | 75 psi | " | " | Cut 1" and ¾" links | 1.05 |
| | 200 | 75 psi | " | " | Cut ½" link | .98 |
| | 200 | 75 psi | " | " | Cut 2" links | 1.06 |
| | 200 | 75 psi | Aluminum | " | Cut in excess of 8" of ¼" plate | 1.13 |
| | 200 | 75 psi | Brass pipe coupling | " | Very little penetration | 1.21 |
| | 300 | 80 psi | " | " | Cut 1.5" | .80 |
| | 300 | 80 psi | " | " | Cut 1.5" | 1.10 |
| | 300 | 80 psi | 178 " mild steel plate | " | Cut 6" | 1.42 |
| | 300 | 95 | " | " | Cut 8" | 1.40 |
| Ceramic | 300 | 95 psi | 8" mild steel | Bad electrolysis causes coating to fall off | Cut is good but by the end of cut the coating offers no insulation and rod arcs through side. | .86 |
| | 300 | 95 psi | 178 " mild steel | " | " | 1.09 |
| | 300 | 95 psi | " | " | " | .60 |
| Slurry ceramic | 300 | 95 psi | " | Good | Good cut 8" coating is too thick and does not consume with the rod. Coating often extends beyond rod when burning. | 1.32 |
| | 300 | 95 psi | " | " | " | 1.28 |

It was finally ascertained that 150 amps and 60 to 90 psi over bottom pressure produced the best results at all depths.

It has been found that operation of the above-described apparatus can be improved by concentrating the flow of reactive gas through the electrode, and that such increased concentration can be attained using an electrode made in accordance with the embodiment of FIG. 5. As shown therein, the overall structure is similar to that shown in FIGS. 1-4, the difference being in FIG. 5. The cutting speed of the torch is thus greatly increased without increasing the current supply or gas structure.

Figure 6:
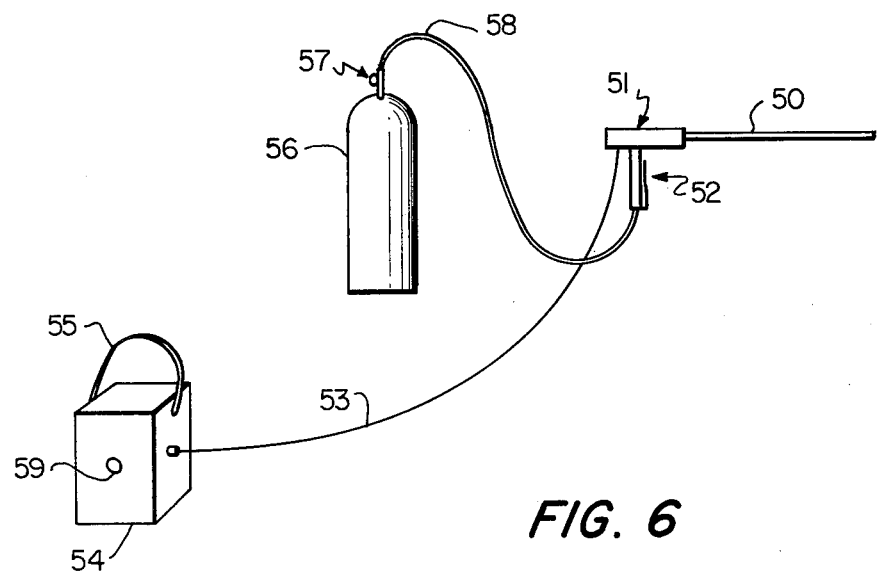
FIG. 6 is a schematic drawing of a portable system according to the invention.
Figure 7:
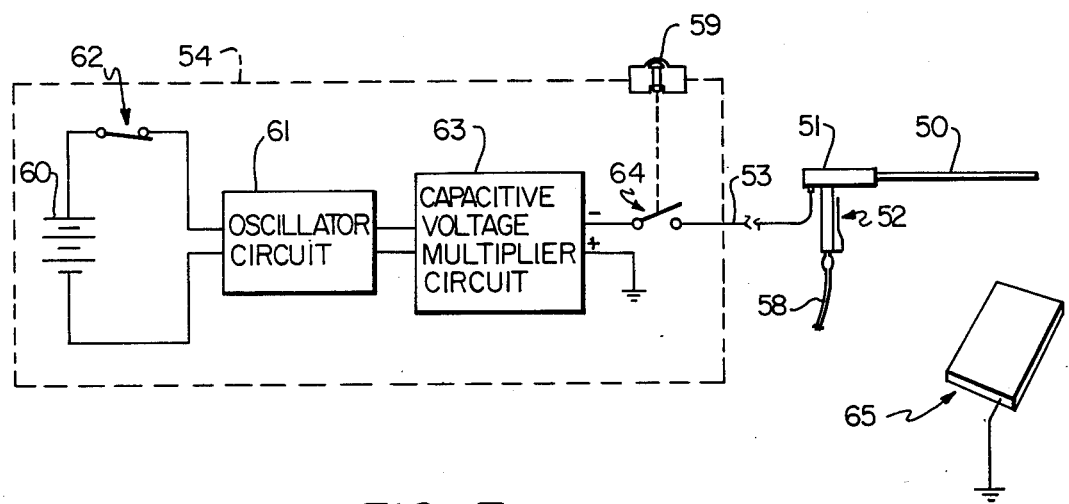
FIG. 7 is a schematic block diagram of an ignition power supply usable in the system of FIG. 6.

An embodiment of a cutting torch system incorporating an electrode of the type previously discussed is shown in FIGS. 6 and 7, this system being a portable one which permits cutting to be accomplished at great depths, on the order of 1,000 feet below the surface of the water, without reliance upon cables, umbilicals or other interconnections with a surface vessel. As shown in FIG. 6, the components of the system are an electrode 50 which is replaceably retained in a handle structure 51 having a grip portion indicated generally at 52 with a valve, substantially as shown in FIG. 1. An electrical conductor 53 interconnects the electrode, through the handle, with a portable power supply unit 54 which is sealed to prevent ingress of water and which is supplied with a carrying strap 55. Finally, the system includes a portable oxygen tank 56 which can also be supplied with carrying straps to be carried on the back of a diver. Oxygen tank 56 is provided with a valve and coupling apparatus indicated generally at 57, the valve and control thereof being conventional in nature. A hose 58 interconnects the valve with the manually operable valve 53 in the handle portion of the device. The advantage of this portable system is that the power supply can provide sufficient electrical energy to the electrode so that, when the electrode is brought into contact with a grounded striker plate, ignition is initiated. Oxygen flow is then commenced, permitting the electrode to continue burning as previously described. The power supply can then be disconnected and no longer used. In this form of the system, the power supply can be relatively small since it need not provide continuous electrical current to assist in the cutting operation. A manually operated switch 59 can be supplied on the power supply unit, which switch can be operated manually and momentarily when ignition is to be started.

A block diagram of a suitable power supply unit is shown in FIG. 7 wherein a battery 60 is connected to an oscillator circuit 61 to supply electrical energy thereto. The oscillator circuit can be of any conventional free-running type to produce an output signal which is approximately sinusoidal in nature. An ON-OFF switch indicated generally at 62 can be provided to disconnect the battery from the oscillator circuit when the apparatus is not in use.

The output of the oscillator circuit is connected to the input of a conventional capacitive voltage multiplier circuit 63 which operates to multiply the amplitude of the osciallator circuit and to store the multiplied voltage in a capacitive output circuit. Circuits of this general category are well known and are therefore not described herein in detail. One terminal of the voltage multiplier circuit output is connected to ground and the other, high voltage, terminal thereof is connected through a normally open switch indicated generally at 64 to the conductor 53 which leads to the handle portion of the torch assembly. Switch 64 is mechanically interconnected to the switch operator 59 on the exterior of the unit so that depression thereof momentarily closes the switch, permitting the output of the capacitive voltage multiplier to be applied to the electrode through the handle.

A striker plate, which can also be a grounded workpiece, is indicated generally at 65. When the exposed end of electrode 50 is brought into contact with plate 65 and when switch operator 59 is depressed to close switch 54, the output of the voltage multiplier circuit is applied through the electrode to ground to cause an arc at the end of the electrode to initiate ignition as previously described. Switch 64 can then be permitted to open and the cutting can be continued with the oxygen flow supplied to the electrode.

Although it is not essential for the exterior surface of electrode 50 to be insulated with a system of this type, such insulation is advantageous in that it prevents inadvertent ignition at an intermediate point along the length of the electrode.

While certain advantageous embodiments have been chosen to illustrate the invention, it will be understood by those skilled in the art that various changes and modifications can be made therein without departing from the scope of the invention as defined in the appended claims.

What is claimed is:

1. A cutting torch primarily for underwater use in which electrical current and reactive gas flow are used in combination to cause progressive burning of a substantially rigid metallic electrode, the torch comprising
    a substantially rigid metallic electrode comprising
        a substantially rigid metallic tube;
        a plurality of ferrous metal rods extending longitudinally within said tube from one end thereof to the other;
        at least one rod made of a metal selected from the group consisting of aluminum, magnesium, titanium and alloys thereof disposed within said tube; and
        a layer of insulating material substantially covering the exterior surface of said tube;
    means for connecting a source of electrical current to said tube and for applying electrical current thereto; and
    means for connecting a supply of reactive gas to said tube,
    said ferrous rods and said at least one rod being circularly arranged in said tube against the inner surface thereof with the centers of said rods lying substantially on circle having as its center the central axis of said tube, the arrangement of said rods defining a central channel along the axis of said tube.

2. A portable cutting torch system primarily for underwater use in which electrical current and reactive gas flow are used in combination to cause progressive burning of a substantially rigid metallic electrode, the torch system comprising
    a portable supply of reactive gas;
    a portable electrical power supply unit;
    a cutting torch including a handle portion and an electrode replaceably held in said handle portion;
    electrical conductor means for interconnecting said power supply unit and said electrode through said handle portion; and
    conduit means for conducting gas from said supply to said electrode through said handle portion;
    and wherein said electrode comprises
        a substantially rigid metallic tube;
        a plurality of ferrous metal rods extending longitudinally within said tube; and
        at least one rod made of a metal selected from the group consisting of aluminum, magnesium, titanium and alloys thereof disposed within said tube,
        said ferrous rods and said at least one rod being circularly arranged in said tube against the inner surface thereof with the centers of said rods lying substantially on a circle having as its center the central axis of said tube, the arrangement of said rods defining a central channel along the axis of said tube.

3. A system according to claim 2 wherein said handle portion includes manually operable means for controlling the flow of said gas to said electrode.

4. A system according to claim 2 wherein said power supply unit includes
   a battery; and
   circuit means connected to said battery for producing an output voltage which is a multiple of the battery terminal voltage and for supplying said output voltage to said conductor means.

5. A system according to claim 4 wherein said circuit means in said power supply unit includes
   manually operable switch means for controlling the connection of said output voltage to said conductor means.

6. A system according to claim 5 wherein said circuit means further includes
   an oscillator connected to said battery, and
   a capacitive voltage multiplying circuit connected to said oscillator and to said switch means.

7. A cutting electrode primarily for underwater use in which electrical current and reactive gas flow are used in combination to cause progressive burning of a substantially rigid cutting metallic electrode comprising
   a metallic tube;
   a plurality of ferrous metal rods within said tube;
   at least one rod made of a metal selected from the group consisting of aluminum, magnesium, titanium and alloys thereof disposed within said tube; and
   a layer of insulating material substantially covering the exterior surface of said tube;
   means for connecting a source of electrical current to said tube and for supplying electrical current thereto; and
   means for connecting a supply of reactive gas to said tube, said ferrous rods and said at least one rod being arranged in said tube against the inner surface thereof with the centers of said rods lying substantially on a circle having as its center the central axis of said tube, the arrangement of said rods defining a central channel along the axis of said tube.

8. A portable cutting torch system primarily for underwater use in which electrical current and reactive gas flow are used in combination to cause progressive burning of a metallic electrode, the torch system comprising
   a portable supply of reactive gas;
   a portable electrical power supply unit;
   a cutting electrode;
   electrical conductor means for interconnecting said power supply unit to said electrode; and
   conduit means for conducting gas from said supply to said electrode;
   and wherein said electrode comprises
   a metallic tube; and
   a plurality of ferrous metal rods within said tube including at least one rod made of metal selected from the group consisting of aluminum, magnesium, titanium and alloys thereof disposed within said tube, said ferrous rods and said at least one rod being circularly arranged in said tube against the inner surface thereof with the centers of said rods lying substantially on a circle having as its center the central axis of said tube, the arrangement of said rods defining a central channel along the axis of said tube.

* * * * *